May 15, 1962 S. BÖHM ET AL 3,034,412
PHOTOGRAPHIC CAMERAS OF THE TWO-FILM TYPE
Filed Dec. 13, 1957 9 Sheets-Sheet 1

INVENTOR.
Siegfried Böhm
Rudolf Hainy
Rolf Jurenz,
AND
Gert Jehmlich

May 15, 1962 S. BÖHM ET AL 3,034,412
PHOTOGRAPHIC CAMERAS OF THE TWO-FILM TYPE
Filed Dec. 13, 1957 9 Sheets-Sheet 2

INVENTOR.
Siegfried Böhm
Rudolf Hainy
Rolf Jurenz
and
Gert Jehmlich

INVENTOR.
Siegfried Böhm
Rudolf Hainy
Rolf Jurenz,
and
Gert Jehmlich

May 15, 1962  S. BÖHM ET AL  3,034,412
PHOTOGRAPHIC CAMERAS OF THE TWO-FILM TYPE
Filed Dec. 13, 1957  9 Sheets-Sheet 5

INVENTOR.
Siegfried Böhm
Rudolf Hainy
Rolf Julent,
and
Gert Jehmlich

May 15, 1962 S. BÖHM ET AL 3,034,412
PHOTOGRAPHIC CAMERAS OF THE TWO-FILM TYPE
Filed Dec. 13, 1957 9 Sheets-Sheet 8

INVENTORS
SIEGFRIED BÖHM
RUDOLF HAINY
ROLF JURENZ
GERT JEHMLICH
BY
ATTORNEYS

May 15, 1962 S. BÖHM ET AL 3,034,412
PHOTOGRAPHIC CAMERAS OF THE TWO-FILM TYPE
Filed Dec. 13, 1957 9 Sheets-Sheet 9

INVENTOR.
Siegfried Böhm
Rudolf Heinz
BY Rolf Jurenz,
2nd
Gert Jettmlich

United States Patent Office 3,034,412
Patented May 15, 1962

3,034,412
PHOTOGRAPHIC CAMERAS OF THE
TWO-FILM TYPE
Siegfried Böhm, Rudolf Hainy, Rolf Jürenz, and Gert Jehmlich, Dresden, Germany, assignors to VEB Kamera- und Kinowerke Dresden
Filed Dec. 13, 1957, Ser. No. 702,585
Claims priority, application Germany Oct. 22, 1957
25 Claims. (Cl. 95—31)

This invention relates to improvements of photographic cameras of the two-film type suited for simultaneous use of two films, as black-and-white, color or reversible films, or films of different gradation, which can be alternately exposed.

In known two-film cameras of this class a single lens with a central shutter serves for selectively exposing one of the two films the spools of which lie parallel to the optical axis of the camera, and a mirror or prism is positioned between them for deflecting the path of rays to the films. The mirror or prism is rotatable to permit deflection of the ray path to one or the other film and exposure thereof.

According to the invention, the two films are selectively exposed by a single focal plane shutter instead of a central shutter, and the focal plane shutter is so arranged and constructed that its two curtains, when running off simultaneously, cause exposure of the two films, for instance of an upper and a lower one. The two curtains move between each of the two films and a reflex arrangement, past the two picture gates of the films, and each curtain has two cut-outs forming slits by means of which upon movement of the shutter both the upper and the lower film are simultaneously exposed.

The reflex arrangement between the moving curtains of the focal plane shutter consists of two movable mirrors which in their effective reflecting positions alternately deflect the ray path to the upper or the lower film. When in their inoperative positions, both mirrors close the respective picture gate and thus cover the associated film. Selective setting for exposure of one or the other film is performed by a common control gear which also causes change-over of the feeding means coupled with the shutter winding for the film that has been set for exposure.

For releasing and controlling the two mirrors, which by moving into the reflecting positions release the shutter, a common releasing mechanism is provided. The return of this mechanism to the initial position and of the mirrors to their ineffective positions is brought about by a common driving gear which also winds the shutter and feeds one or the other film.

The means for exposing one or the other film permits this change only when the shutter is tensioned while in case of an erroneous switch-over the camera release remains blocked. This arrangement ensures reliable operation and avoids gear troubles and faulty exposures which may occur as a result of faulty operation.

Other features and details of the invention are set forth in the following description of a typical embodiment illustrated in the accompanying drawings in a somewhat schematic manner, wherein, for better understanding, the camera housing is shown in various views, sections and partial sections. Parts not required for explanation of the operative elements have been omitted for the sake of clarity. Parts performing the same function in both film systems bear the same reference numeral with the mark (′) added to indicated the second film system.

Figure 1:
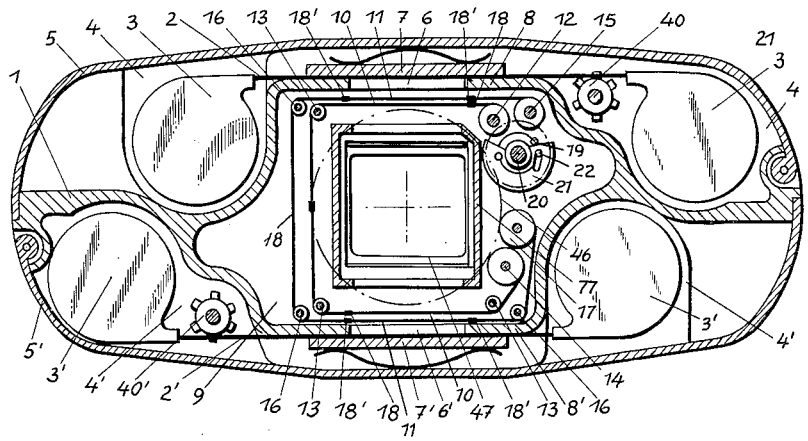
FIGURE 1 is a section of the camera, seen from the rear side thereof, showing the two film systems and the curtains of the focal plane shutter.

According to FIGS. 1 to 17, the camera body 1 is equipped for the reception of two films 2, 2′ with their cassettes 3, 3′, each film with its cassettes being placed in a separate chamber 4, 4′ which can be closed light-tight and opened by removable or hinged covers 5, 5′. Within the ranges of their respective picture gates 6, 6′, the two films 2, 2′ are pressed against slide stages or frames 8, 8′ by elastically disposed presser plates 7, 7′.

The focal plane shutter is provided in an enclosed space 9 and comprises curtains 10 and 11. The light-admitting curtain 10 is guided by a driving roller 12 over guide rolls 13 to a winding-up roller 14. The curtain 11, which shuts off the exposure, is guided by a driving roller 15 over guide rolls 16 to a winding-up roller 17. Each winding-up roller 14, 17 is subject to the action of a spring, not shown, which in a known manner causes tensioning and motion of the curtains 10, 11. The latter are guided around a reflex mechanism to be described later, and serving to expose the two films 2, 2′. For this purpose each of the curtains 10, 11 is provided with two respective cut-outs which, during the movement of the curtains, pass the corresponding upper and lower picture gates 6, 6′. The edges 18, 18′ of the slits formed by these cut-outs are thickened in FIG. 1 for better illustration.

The tensioning and releasing of the two curtains 10, 11 is effected by a common driving gear which, as shown in FIG. 1, comprises a driving disc 19 firmly connected with a shaft 20. Besides the driving disc 19, the shaft 20 carries a loosely disposed shutter winding wheel 21 provided with a rotatable wedge 22 which is moved into locking position by a spring. A second gear wheel 23 is also arranged on the shaft 20 (FIG. 2) and is in mesh with the pinion of the curtain driving roller 15. The gear wheel 23 is fitted with a driving pin 24 and a control cam 25. Furthermore, a gear wheel 26 (FIG. 3) is firmly connected with the shaft 20 and is in mesh with the pinion of the curtain driving roller 12; it is also provided with an annular recess 27 which is engaged by the driving pin 24 of the gear wheel 23. A stop 28 is secured to the gear 26 which at the end of the shutter motion passes between two leaf springs of a stationary clamping piece 29, whereby the motion of the shutter is limited and braked down.

Figure 2:
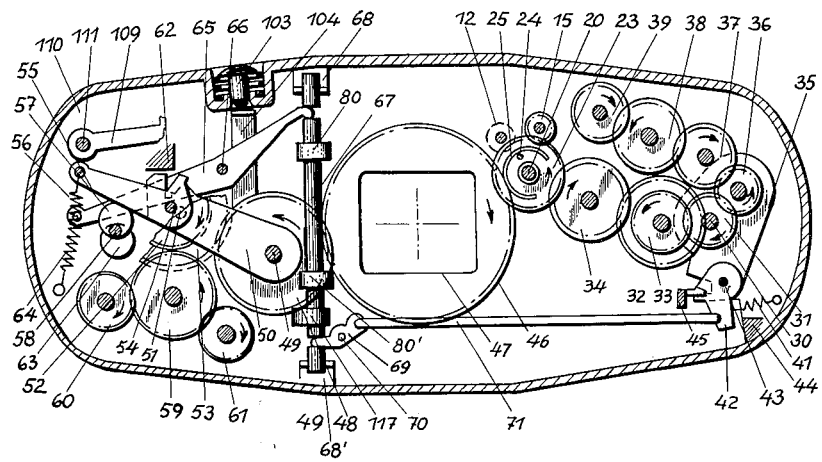
FIG. 2 is a section of the camera similar to FIG. 1 but taken in a different plane, showing the driving gear for winding the shutter and the film feed mechanism coupled therewith, the feed for the upper film being shown in the engaged condition while that for the lower film is disconnected.

The tensioning of the shutter may be performed in a known manner by a turning knob (not shown) or high-speed tensioning lever coupled with a shaft 30 to which a gear wheel 31 is secured whose rotary motion is transmitted, when winding it in the direction of the arrow applied thereto in FIG. 2 by means of intermediate gears 32, 33, 34, to the shutter wheel 21 on shaft 20 (FIG. 1). During this winding action the rotatable wedge 22, by way of driving disc 19, shaft 20 and gears 23, 26, causes the tensioning or winding-up of the two curtains 10, 11.

The selective coupling of the shutter setting with the picture-by-picture feeding of the two films 2, 2′ is carried out in the following manner:

On the shaft 30 (FIGS. 2, 3) a sheet bar 35 is movably disposed and supports a gear wheel 36 which is in continuous engagement with the gear wheel 31. By turning the sheet bar 35, the gear wheel 36 can be brought into and out of engagement with a gear wheel 37 of a film feed gear comprising gear wheels 38, 39, the gear wheel 37 driving the film spool and the gear wheel 39 a feed roller 40 for the upper film 2. Coupling of the gear wheel 36 with gear wheel 37 is effected by a spring 41 hooked to a locking member 42 which, by a bolt 43, is articulated to the sheet bar 35. In its coupled position the locking member 42 is caught between two stops 44, 45 and thereby ensures the coupling engagement.

The winding wheel 21 of the shutter is in mesh with a central wheel 46 arranged around a finder aperture or cut-out 47. An intermediate wheel 48 is driven by the wheel 46, said wheel 48 resting on a pivot 49 supporting a control lever 50. On the pivot 51 a driver consisting of two gear wheels 52, 53 is rotatably disposed in such manner that gear wheel 53 is in constant engagement with the intermediate wheel 48. A checking lever 55 is articulated on a pin 54 to the control lever 50, while a spring 56 is hooked to one end of said lever 55. Owing to the action of the spring 56, the checking lever 55 rests on an eccentric 57 which is firmly connected to a control shaft 58 which is guided through the rear wall of the camera and carries on its outer end a turning knob 58′.

Figure 3:
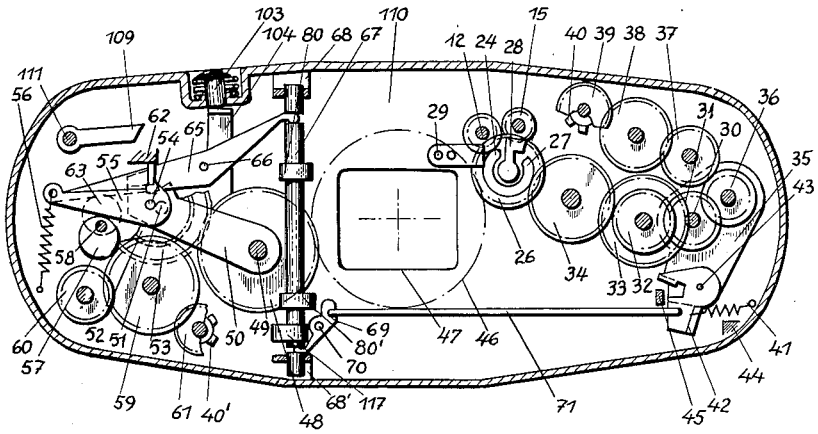
FIG. 3 shows the same arrangement as FIG. 2, but this time the feed for the lower film is engaged and that for the upper one is disconnected.

In the coupling position shown in FIG. 3 the gear wheel 52, owing to the action of the spring 56, is in engagement with an intermediate gear wheel 59 by which on the one hand a gear wheel 60 and on the other hand a gear wheel 61 is driven. In turn, the gear wheel 60 drives the film spool and the gear wheel 61 a feed roller 40′ for the lower film 2′. In this coupled position the checking lever 55 is held by a stop 62 whereby the coupling engagement is ensured.

To the control shaft 58, besides the eccentric 57, a second eccentric 63 is secured against which, by action of a spring 64, bears a two-armed control lever 65 which is movably positioned on a stationary pin 66. By its fork-like arm the control lever 65 is coupled with a camshaft 67 guided in two bearings 68, 68′ and capable of moving both in radial and in axial direction. As will be explained later on, the camshaft 67 releases the reflex mechanism. A second double-armed lever 69, movably disposed on a stationary pin 70, is coupled to the other end of the camshaft 67. The lever 69 is articulated to a drawbar 71 which, at its other end, is articulated to the locking member 42.

The described arrangement establishes the connection of the feeding mechanisms for the films 2, 2′.

FIG. 2 shows the shutter winding means coupled with the feed of the upper film 2, while the feed for the lower film 2′ is uncoupled. By the action of eccentric 57, the locking lever 55 is moved out of range of the stop 62, whereby the gear wheel 52 has been disengaged, by action of lever 50, from the gear wheel 59 of the lower-film feeding means and the control lever 65, lying by spring action on the eccentric 63, has displaced the camshaft 67 upwards in axial direction. The lever 69 and the drawbar 71, by way of the locking member 42 and the sheet bar 35, have therefore coupled the gear wheel 36 to the intermediate gear 37 of the upper-film feeding means. Owing to the rotation of the shaft 30, the shutter is tensioned in this position by way of the gear wheels 31, 32, 33, 34 and 21 while the upper-film feed is actuated by the way of the gears 36 to 39.

The change-over to the lower film is attained by turning the control shaft 58 by 180°, as shown in FIG. 3.

During this switch-over the locking lever 55 follows the eccentric 57 together with the control lever 50 due to the action of spring 64 and thereby causes engagement of the gear wheels 52 and 53 of the lower-film feed. At the same time, the camshaft 67 is displaced downwards in axial direction by the eccentric 63 by way of the control lever 65, whereby the locking member 43 moves out of range of the stop 45 on effect of lever 69 and drawbar 71, so that the gear wheel 36 is disengaged from the wheel 37 of the upper-film 2 feed by action of the sheet bar 35. When the shutter is tensioned in this switching position, the lower-film feed will be actuated by way of the shutter wheel 21, the central gear 46 and the gear wheels 48, 53, 52, 59, 60 and 61.

The camshaft 67 also serves to control the reflex mechanism which, as shown in FIGS. 4 to 9, substantially comprises two swivelling mirrors 72, 72′, the mirror 72 causing exposure of the upper film 2 and mirror 72′ that of the lower film 2′. Each mirror is secured to a separate holder 73, 73′ which is movable on both sides of the mirror casing 77 by means of journals 74, 74′. When in the inoperative positions, both mirrors cover the respective picture segment of their film. For this purpose, layers 75, 75′ of a light-tight and elastic sealing material are provided. In this ineffective mirror position, the mirrors 72, 72′ are kept locked by a leaf spring 76 engaging from below the front edges of the two mirror holders 73, 73′. Selective release of one of the two mirrors 72, 72′ takes place by means of two rods 78, 78′ guided on the mirror casing 77 in bearings 79, 79′, so that the mirrors are moved by spring action into their effective reflecting positions. The rods 78, 78' are arranged perpendicular to the camshaft 67 and are actuated selectively by cams 80, 80'.

Figures 4, 5:
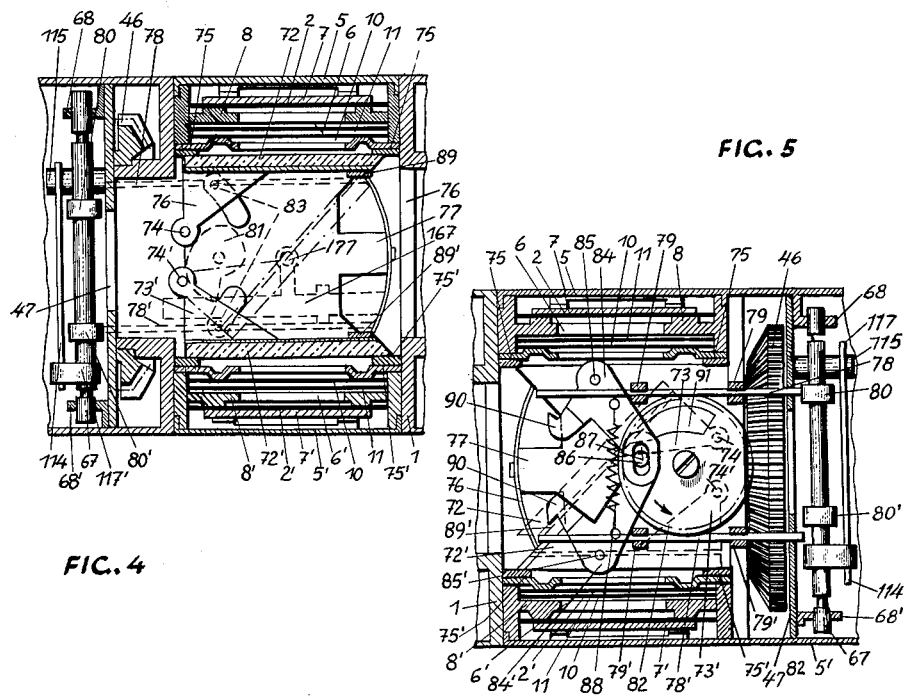
FIG. 4 is a lateral section of the camera, seen from the right side of FIGS. 1–3, showing the details of the reflex mechanism, both mirrors being ineffective and covering the respective films.
FIG. 5 is a lateral section of the camera, seen from the left side of FIGS. 1–3, partly broken away, showing the releasing, locking and cocking mechanism of the mirrors.

When the camera is set for exposure on the upper film 2, the camshaft 67 is moved upwardly and the cam 80 is within range of the releasing rod 78, as indicated in FIGS. 2 and 3. In this position, when the camshaft 67 is turned, the cam 80 actuates the releasing rod 78 which in turn moves the upper part of spring 76 out of its locking position, whereby the upper mirror 72 is caused to swing into the effective reflecting position by the action of a spring (not shown). When setting the camera for exposure on the lower film 2', the camshaft 67 is forcibly displaced downwardly and this time it is cam 80' which is placed within range of the releasing rod 78' as shown in FIGS. 3 and 4. In this position, owing to the rotation of the camshaft 67 by the cam 80', the releasing rod 78' is actuated and moves the lower part of spring 76 out of its locking position, whereby the lower mirror 72', due to the action of a spring, swings into the effective reflecting position, as indicated by broken lines in FIG. 5.

The mirrors 72, 72' are returned from their operative positoins into the rest position where they cover the film, owing to the action of a cam disc 81 arranged in the mirror casing 77 and indicated in broken lines in FIG. 4. The cam disc 81 is driven by a crown wheel 82 driven by the central wheel 46 constructed as a crown and spur gear. The two mirror holders 73, 73' are each fitted with a lateral pin 83, 83' by means of which one or the other mirror is returned during the tensioning of the shutter from its reflecting to its covering position through the action of the cam disc 81.

Furthermore, a locking device is provided for keeping the mirrors 72, 72' locked in their operative positions so as to prevent rebounding and subsequent vibration of the mirrors when they stop in the reflecting position, which would result in a possible lack of definition of the images. This locking device consists of two check levers 84, 84' provided on the mirror casing, rotatable about pins 85, 85' and biased by a spring 88 into their locking positions. The two check levers 84, 84' are coupled in scissor-like fashion by means of a pin 86 secured to the check lever 84' and engaging a slot 87 of the other check lever 84. The two mirror holders 73, 73' are fitted with laterally projecting straps 89, 89' which, when the mirrors 72, 72' are in the effective position, are gripped by locking noses 90, 90' of the check levers 84, 84', whereby the mirrors 72, 72' are locked and secured in their reflecting position. They are released from this position by a cam 91 fastened to the crown wheel 82 and engaging in the course of the shutter tensioning the coupling pin 86 secured to the check lever 84', whereby the coupled pair of check levers 84, 84' is moved out of the locking position. The mirrors 72, 72' are then returned by the cam disc 81 to their ineffective positions.

Figure 8:
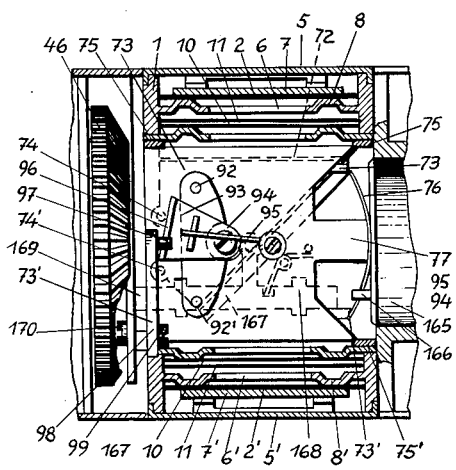
FIG. 8 is a sectional view of the reflex mechanism similar to FIG. 6, with the lower mirror pivoted to reflect light.

On the other side of each holder 73, 73', a pin 92, 92' is fixed which actuates a control member 93 when the mirrors 72, 72' are moved into the reflecting position. The member 93 is movably arranged on a screw 94 disposed on the mirror casing 77 and held by a swinging spring 95 in the ineffective position shown in FIG. 6. The control member 93 is provided with a two-part cam 96 against which, by means of a guide pin 97, a spring-actuated toggle lever 98 abuts which is similiarly provided on the mirror casing 77 and is movable about a screw 99. The toggle lever 98 is connected, by a member 100, with a double-armed lever 102 movable about a pin 101 and actuating the rotatable wedge 22 of the shutter wheel 21. When one or the other mirror is moved into the reflecting position, as shown in FIG. 8, the control member 93 will be moved in one or the other direction by the pins 92, 92' as described, thereby releasing the locked rotatable wedge 22 through the two-part cam 96 by way of toggle lever 98, member 100 and lever 102. Wedge 22 thus frees the driver 19 and thereby releases the run of the shutter.

Figure 6:
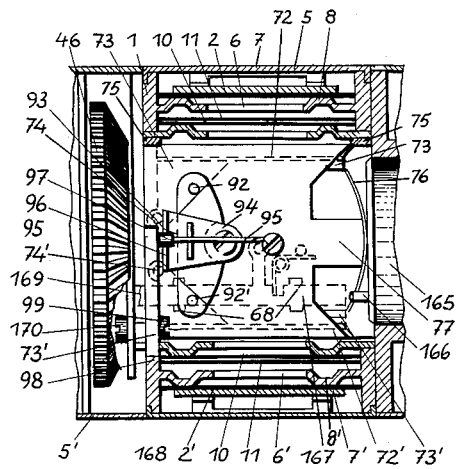
FIG. 6 is a lateral section seen from the right side, illustrating the reflex mechanism with the mirrors positioned to prevent exposure of both films.
Figure 7:
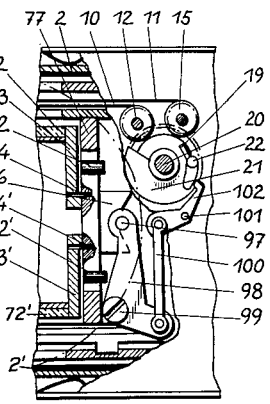
FIG. 7 is a section seen from the rear and partly broken away, illustarting the connection of the shutter release to the reflex mechanism with the mirrors in the position of FIG. 6.
Figure 9:
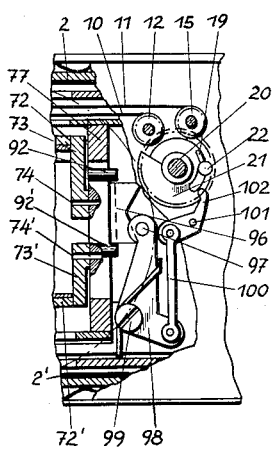
FIG. 9 is a sectional view of the connection of the shutter release similar to FIG. 7, with the lower mirror in the position of FIG. 8.
Figure 10:
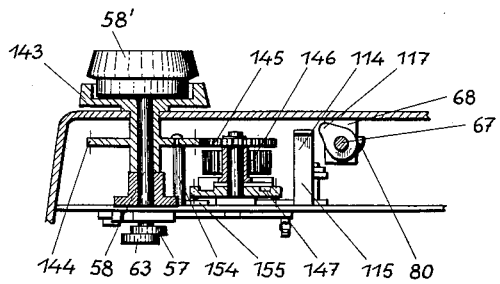
FIG. 10 is a partial section of the camera, seen from above, showing the turning knob and the related mechanism.
Figure 11:
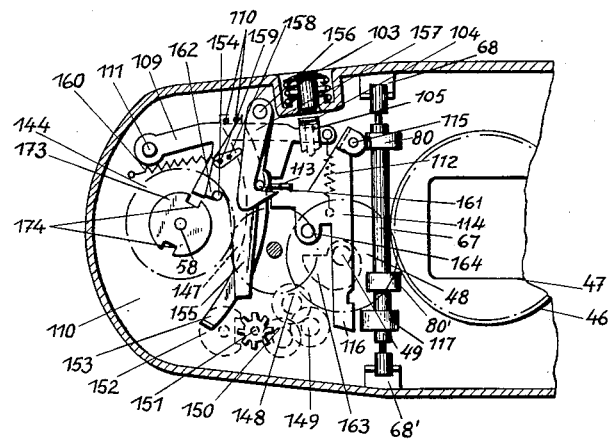
FIG. 11 is a sectional view of the camera, seen from the rear and partly broken away, illustrating the release mechanism in the tensioned position.

FIGS. 7 and 9 are sectional rear views of the mechanism as shown in FIGS. 6 and 8, respectively.

Figure 12:
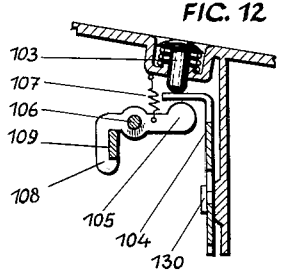
FIG. 12 is a sectional detail of the releasing knob of the camera in the position following the release action.
Figure 13:
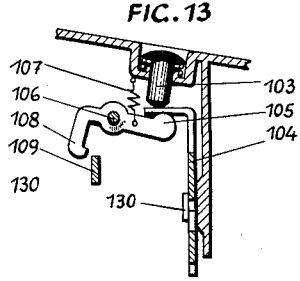
FIG. 13 is a sectional detail of the releasing knob similar to FIG. 12, in a second position.

The camera is released by a spring-controlled knob 103 recessed in the camera housing. As FIGS. 12 and 13 show, the releasing knob 103 actuates during the releasing movement a push rod 104 and a releasing lever 105 in contact with it, this lever 105 being movable about a stationary pin 106. The releasing lever 105 and the push rod 104 are drawn against the releasing knob 103 by a spring 107, and the releasing lever 105 embraces with its locking arm 108 a control lever 109 arranged on a sheet bar 110 and movable about a screw 111. During the release, the lever 105 frees the control lever 109 which is moved downwardly by the action of a spring 112 so that it strikes against a strap 113 of a bell crank 114, movably disposed on a stationary bolt 115, and turns it against the action of its spring. In the course of this turning movement, the control lever 109, by means of its bent arm 116, actuates a cam 117 of the camshaft 67 and imparts rotary motion to it, whereby— in the manner described—one or the other cam 80, 80' releases one of the two mirrors 72, 72' which, while moving into the reflecting position, releases the shutter.

Figure 16:
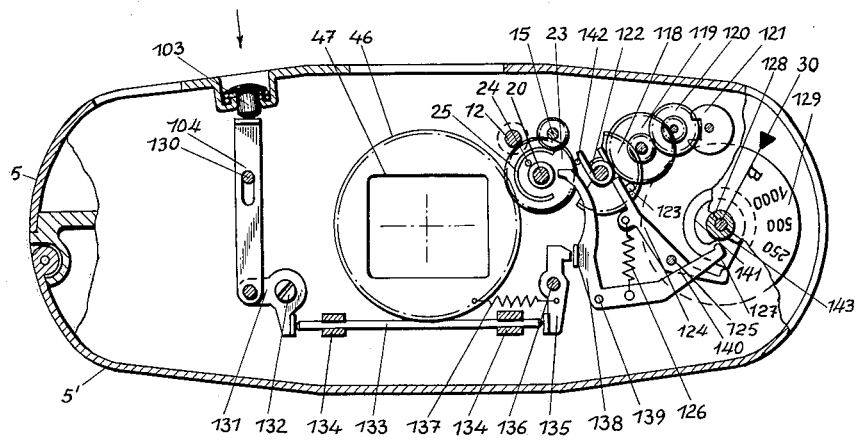
FIG. 16 is a section of the camera similar to FIGS. 2, 3, but taken in another plane, illustrating the shutter timing control in bulb time operation with the releasing knob depressed.
Figure 17:
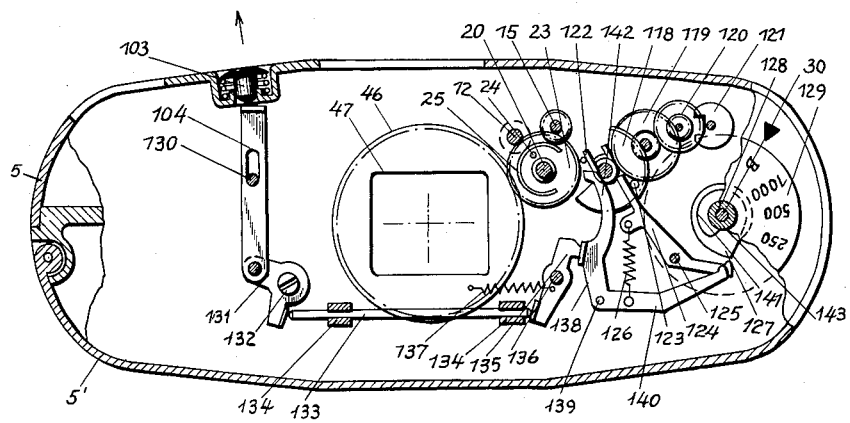
FIG. 17 is a section of the camera shutter timing mechanism similar to FIG. 16, in a second operative position.

The exposure time can be regulated in a known manner by an adjustable checking mechanism comprising, as shown in FIGS. 16 and 17, a tooth segement 118, driving gears 119, 120 and a member 121. The tooth segment is moved by a spring 122 into the path of the control cam 25 of the shutter wheel 23 and is fitted with a stop pin 123.

Against the pin 123 abuts a control lever 124 which is positioned on a stud 125 and which with its other arm, by the action of a spring 126, bears against a time setting cam 127 firmly connected by a shaft 128 with a time setting knob 129. When the knob 129 is being set, the control lever 124 follows the cam 127 and thereby allows the tooth segment 118 to pass more or less within the range of motion of the control cam 25, whereby the running off of the curtain 11 is proportionately delayed and the exposure time correspondingly adjusted.

The following arrangement serves for setting bulb time exposure:

The push rod 104 actuated by the releasing knob 103 and guided through a slot by a bolt 130 is articulated to a bell crank 131 arranged about a stationary screw 132. By means of a rod 133 passing through two bearings 134, the bell crank 131 actuates a pressure lever 135 movably disposed on a pin 136 and pressing the rod 133 against the bell crank 131 with the aid of a spring 137. Against the pressure lever 135 abuts, by action of the spring 126, a control lever 138 arranged on a stationary pin 139. The control lever has the form of a bell crank lever and extends with its arm 140 within the range of a control disc 141 which is firmly connected with the time setting knob 129 by a bushing 128 loosely placed around the shaft 30. The other arm 142 of control lever 138 is within the range of the control cam 25 of the shutter wheel 23. For bulb time setting, as shown in FIGS. 16 and 17, the control disc 141 with its recess 143 is so positioned that the arm 140 can drop into the recess, though this is at first prevented by the action of the pressure lever 135. During the releasing action, the pressure lever 135 is displaced against the action of the spring 137 by way of the parts 104, 131, 132 and while this is going on the control lever 138 can follow without interference into the recess 143. The arm 142 can thus pass into the path of the control cam 25 of the shutter wheel 23 so that it hinders the rotary motion until, by the return of the releasing knob 103 to the initial position, the lever 135 moves the control lever 138 out of its locking position and thereby allows the further running off of the shutter. In all other time setting operations the control disc 141 prevents with its front face the engagement of the control lever 138 and, consequently, bulb exposure.

According to the invention, the camera may also be released by way of a delayed time mechanism as shown in FIGS. 10, 11, 14 and 15. The mechanism comprises a knurled winding disc 143 which is loosely arranged below the change-over knob 58' on the control shaft 58 connected to the knob. A gear wheel 144 is fastened to the bush bearing of the winding disc 143 and is in mesh with a gear wheel 145 for a spring barrel 146 which effects the running off of the mechanism in a manner known per se. A delay takes place owing to a checking mechanism which is in engagement with a gear wheel 147 of the spring barrel 146 and includes driving gears 148–151 and a member 152. The running of the checking mechanism is blocked by a lock 153 secured to the control lever 109, for instance by a rivet 110, and preventing at first the movement of member 152. When the control lever 109 movably disposed about the screw 111 is released, the lock 153 is swung out of the range of member 152 and thereby permits the checking mechanism to run off.

The running-off time of the delayed action release is regulated by a pin 154 fastened to the gear wheel 144 of the winding disc 143; a control lever 155 movable about a screw 150 extends into the range of motion of pin 154. A pawl 157 is also movable about the screw 156. A spring lever 159 is disposed on the control lever 155 and is movable about a pin 158, while a spring 160 is hooked to lever 159. Due to the action of the spring 160, the spring lever 159 moves the pawl 157 into a locking position limited by a stop pin 161 that is fastened to the control lever 155, and the spring 160 draws the lever 155 within the turning range of the pin 154. The tensioning of the delayed action device is limited by a stop 162 provided on the control lever 155 and engaged by the pin 154.

The delayed action release mechanism operates as follows:

Assumed it is fully wound up by rotating the disc 143. In this position, shown in FIG. 11, the pin 154 is positioned at the stop 162 of the control lever 155 and the pawl 157 is in locking position, owing to the action of the spring 160, while the locking position is limited by the pin 161. In this position the pawl 157 extends into the range of motion of the strap 113 of the bell crank 114 so that the releasing motion thereof is blocked. During release of the camera or actuation of the releasing knob 103, lever 105 frees the movement of the control lever 109 which, by the action of the spring 112, drops onto the strap 113 of the bell crank lever 114 whose movement is at first prevented by the pawl 157. During this downward motion of the control lever 109 the securing lever 153 fastened thereon is moved out of the range of member 152 and frees the run of the checking mechanism by means of the driving gears 147 to 151, so that it can run off due to the power accumulated in the spring barrel 146. The gear wheel 144 is then moved back by the pin 154, owing to the movement of gear wheel 145, in a direction contrary to the winding. In the course of this rotary movement the pin 154 slides along the appropriately formed control lever 155 whose movement is thus hindered at first. At the end of the run of the delayed action device, the pin 154 (FIG. 13) frees the movement of the lever 155 which then draws the pawl 157 out of the range of the strap 113 by the action of the spring 160 and the stop 161, whereupon the bell crank 114 is able to bring about the previously explained operation of releasing the reflex arrangement and the shutter through the intermediary of the lever 109.

The return to the initial position of the levers 114 and 109 takes place during the winding of the shutter by means of a cam disc 163 which is coupled with the intermediate wheel 48. During the winding motion, the disc 163 moves the lever 114, by means of a pin 164 secured thereto, and also the control lever 109 into their initial positions.

Figure 15:
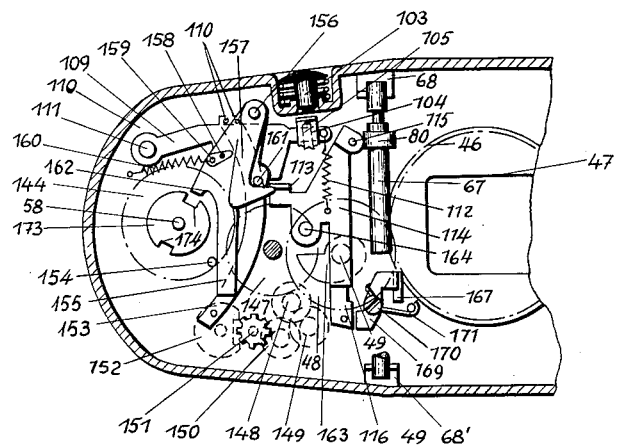
FIG. 15 is a section of the camera release mechanism similar to FIG. 14, in the released position.

The camera according to the invention is equipped for the use of both built in and interchangeable lenses, with or without a preselector diaphragm, pressure diaphragm, semi- or fully automatic snap-action diaphragm. FIGS. 6 and 8 show an example of a diaphragm release according to which an objective lens 165 is provided with a control pin 166 by means of which the diaphragm is released in a known manner. The control pin 166 is actuated and released by a rail 167 guided by bearings 168 on the mirror casing 77 and moved by a spring in the direction of the arrow. In the position where it has moved the diaphragm to the largest aperture, the rail 167 is secured by a locking lever 169, as indicated in FIG. 15. This lever is movably arranged about a stationary screw 170 and is moved into locking position by a spring 171. During the releasing operation, the locking lever 169 is moved out of its locking position by the bell crank lever 114 and frees the rail 167 which in turn releases the control pin 166 by the action of a spring, in consequence whereof the diaphragm sets itself automatically to the preselected value. As shown in FIG. 4, the rail 167 is returned to the locking position by the camshaft 81 through the intermediary of a pin 172 attached to the rail during the winding of the shutter.

Figure 14:
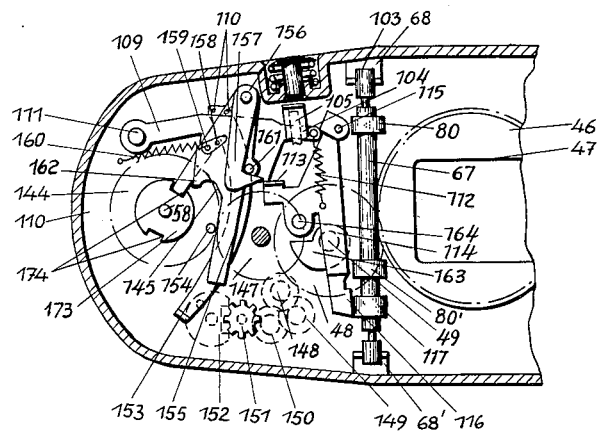
FIG. 14 is a section of the camera similar to FIG. 11, illustrating the release mechanism in a different position.

The change-over mechanism for selective exposure and feed of one of the films 2, 2' operates only after the shutter and the film feed have been tensioned, and the release remains locked if the change has not been properly performed. For this purpose, a stop disc 173 is secured to the control shaft 58 and provided with two cut-outs 174 into which the control lever 109, having a correspondingly formed locking nose 175, can drop after its release (as shown in FIG. 14) provided the change has been correctly carried out. In this way any movement of the shaft 58 is prevented and a change is possible only after the control lever 109 has been returned to the initial position by the winding of the shutter for each exposure. In the negative case, the control lever 109 cannot drop into the cut-out 174 after release so that the releasing operation is locked.

Selective exposure of one of the two films 2, 2' is caused by the two mirrors 72, 72' which in their ineffective positions cover the film picture gates and in the effective reflecting positions deflect the path of rays coming from the objective lens to one or the other film. The film 2, 2' and the curtain 10, 11 of the focal plane shutter proceed vertically, that is, transversely to the optical axis, the films lying in the plane of the image formed by the lens and deflected by the mirrors 72, 72'. Since the mirrors are returned to their ineffective positions after each exposure and cover the films 2, 2' in a light-tight manner, the described arrangement permits the provision of a ground glass or an image field lens 175 in the direction of the optical axis of the lens 165 which can thus serve also as an image finder. The advantage gained thereby is that without the use of an additional finder lens a parallax-free image finder is provided for viewing the image on a 1:1 scale.

Figure 18:
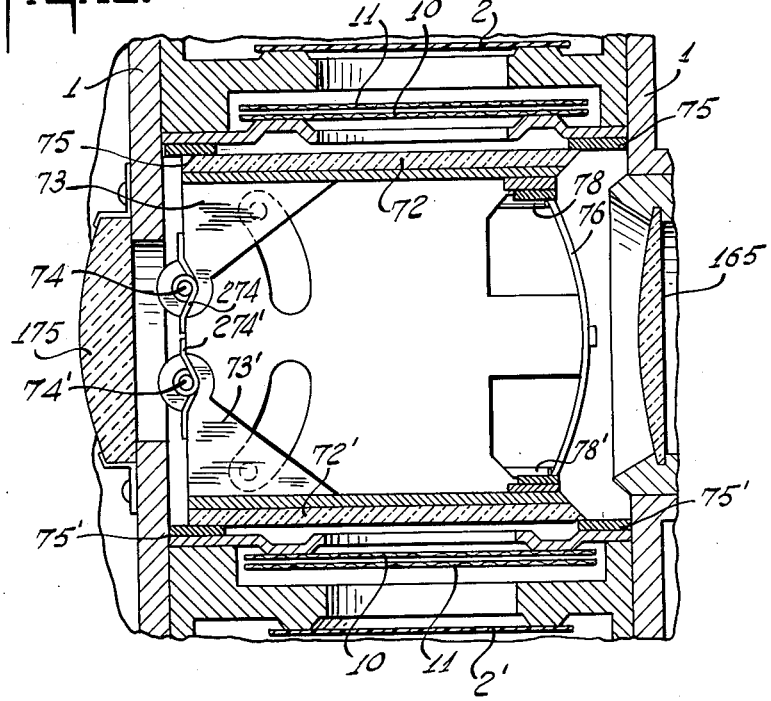
FIG. 18 illustrates, in a section similar to that of FIG. 4, a method of image reversal in the camera for viewing purposes.
Figure 19:
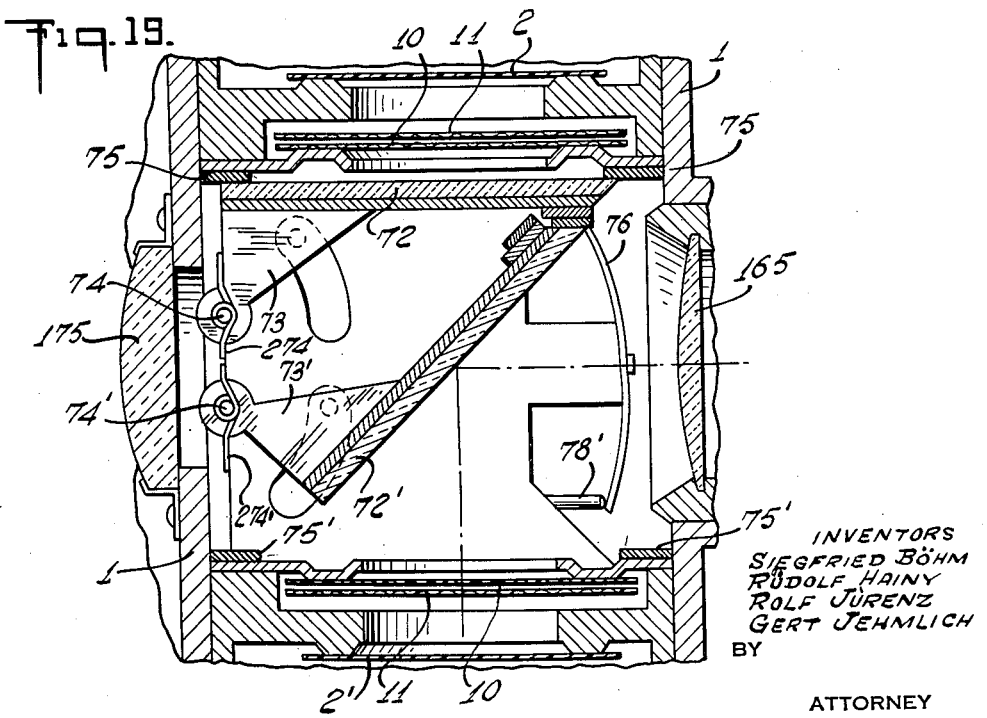
FIG. 19 illustrates, in a section similar to FIG. 18, a second method of image reversal.
Figure 20:
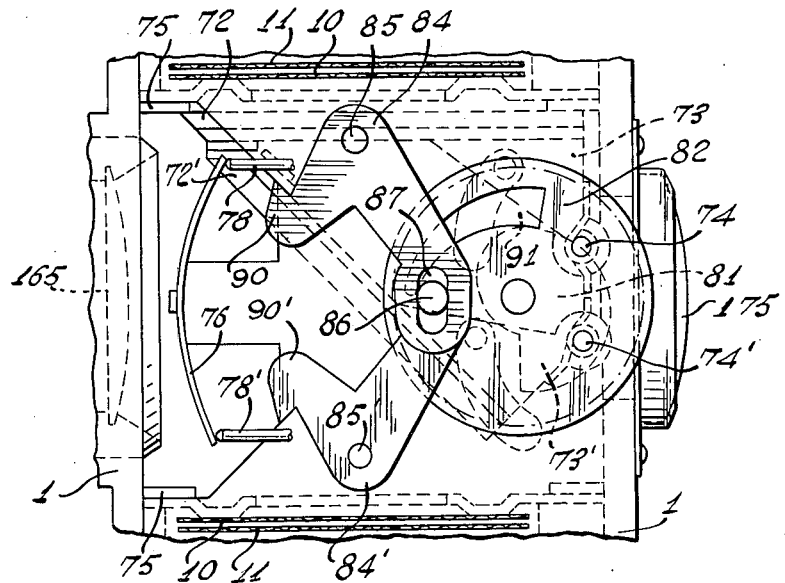
FIG. 20 is a sectional right-side view corresponding to FIGS. 4, 18, 19 and showing the mirrors in the inoperative positions.

In FIG. 20, a sectional side view corresponding to FIGS. 4, 18 and 19, both mirrors 72 and 72' are shown pivoted into the ineffective positions, out of the path of the rays passing through the objective lens 165, and covering both films 2, 2'.

Figure 21:
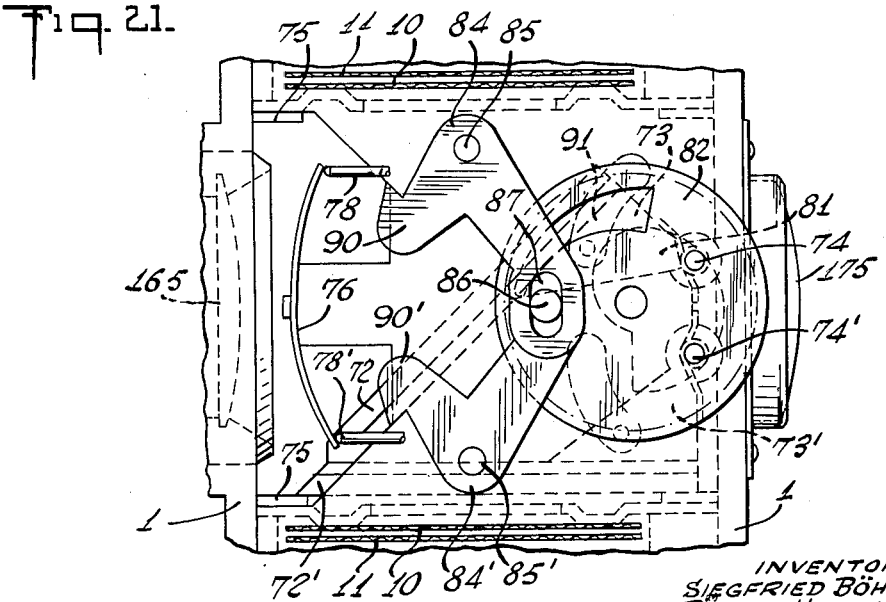
FIG. 21 is a sectional side view similar to FIG. 20 wherein one mirror is in the operative position.

In FIG. 21, a sectional side view similar to FIG. 20, the upper mirror 72 is pivoted out of the path of rays coming from the objective lens 165 while the mirror 72' is articulated into that path. The light passing through the lens is thus reflected toward the lower film which is exposed upon run off of the shutter curtains 10 and 11.

The return of both mirrors 72 and 72' from the path of light into the ineffective positions is effected by torsional springs 274 and 274' positioned about the bearing axes 74 and 74' of the mirrors 72 and 72'.

Figure 22:
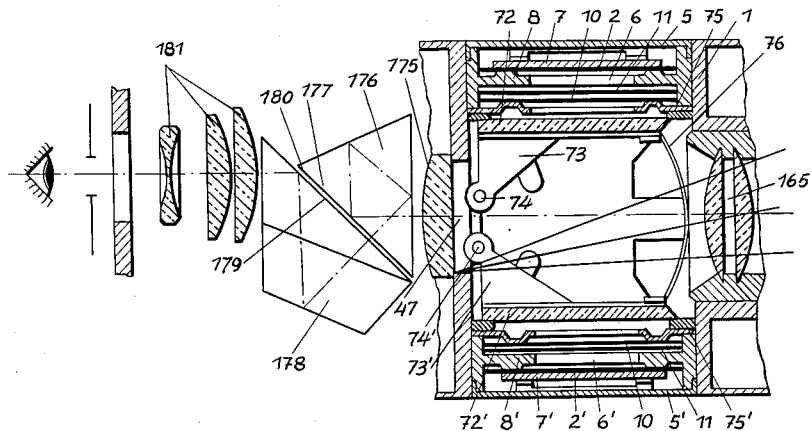
FIGS. 22 and 23 are enlarged sectional left-side views corresponding to FIG. 5 and showing two alternate mirror positions.
Figure 23:
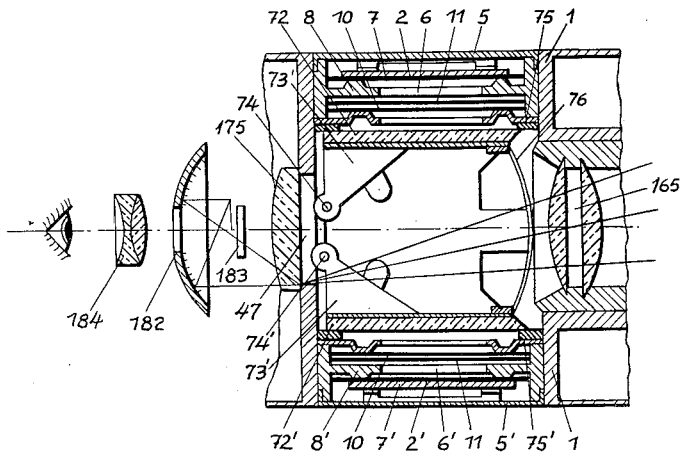

In FIGS. 22 and 23, which are enlarged sectional views of FIG. 5, there is shown the arrangement for selectively releasing the mirrors 72 and 72' into their respective ineffective positions. These mirrors may be locked by the spring 76 and are released out of the locked position by means of control rods 78 and 78' acted upon by the ends of the spring 76. In addition, FIGS. 22 and 23 illustrate the arrangement of the mutually coupled locking levers 84, 84', by means of which each mirror 72 and 72' is locked when it is pivoted into the operative reflecting position. The releasing of locking levers 84 and 84' and the resulting release of the mirrors 72 and 72' with their return movement into the ineffective positions is accomplished, when the shutter is wound, by means of the cam 91 keyed to the crown gear 82. During the tensioning of the shutter, the cam 91 moves the pin 86 and thereby both locking levers 84 and 84' out of the locking position. FIG. 22 illustrates the position wherein by means of the pin 78' the lower mirror 72', shown in broken lines, is pivoted into the optical path of the lens 165 and is locked by lever 84. FIG. 23 shows the mirror 72 locked in the reflecting position by the lever 84'.

For reversing the finder image formed on the ground glass or the image field lens 175, two different optical systems are proposed and diagrammatically shown in FIGS. 18 and 19.

The optical reversing system according to FIG. 18 comprises a Porro or so-called Schmidt prism 176 and a roof-prism 178 with an air gap 180 between them so that their respective surfaces 177, 179 are reflecting, and also a viewing or magnifying system 181 composed of several lenses. The image formed on the image field lens 175 by the objective lens 165 and surrounded by the aperture or cut-out 47 is first deflected by the Schmidt prism 176 and then reversed to normal by the roof-prism 178 so that in case of an appropriate enlargement the finder image having non-reversed sides can be seen on a 1:1 scale through the viewing system or eyepiece 181.

FIG. 19 shows another arrangement for complete reversal of the image at a short distance. In this optical system there is also a ground glass or image field lens 175 provided in the path of rays of the lens 165 which forms thereon a laterally and vertically reversed image. Behind the image field lens 175, a concave mirror 182 is provided and between them a plane mirror 183, so that the side- and height-inverted image formed by the image field lens 175 is thrown by the concave mirror 182 onto the plane mirror 183 which, by reversal of direction, renders the real and reduced image visible in enlarged form when viewed through an eyepiece or magnifying lens 184.

An important feature of the invention is the arrangement of all elements of the optical system, as the objective lens 165, the image field lens 175, the concave mirror 182, the plane mirror 183 and the viewing eyepiece or magnifier 184, in tandem fashion in the direction of a non-refracted optical axis common to all these elements, because this construction affords the advantage of space- and weight-saving compactness.

We claim:

1. In a two-film camera having a housing, an objective lens in said housing for admitting light, film support means in said housing for supporting a pair of films on diametrically opposite sides of the axis of said objective lens, said film support means including film cassettes arranged substantially parallel to said axis, reflex means selectively reflecting said light from said objective lens to one of said films, and a single focal plane shutter in said housing including a pair of elongated parallel curtains supported for movement parallel to each of said films and having a pair of cut-outs in each of said curtains associated with each of said films for exposure of said films, a plurality of rollers parallel to said axis supporting said curtains, said curtains being formed by said rollers into a C-shape.

2. In a two-film camera as set forth in claim 1, said focal plane shutter including a single driving means, said driving means being adapted to selectively transport one of said films.

3. In a two-film camera as set forth in claim 1, viewing means in said housing along the axis of said objective lens opposite said objective lens, for parallax free viewing.

4. In a two-film camera as set forth in claim 1, said reflex means including a pair of pivotally mounted mirrors, locking means selectively retaining said mirrors in position to prevent admission of light to said films, biasing means urging said mirrors into the path of said light, and release means adapted to selectively release said mirrors for movement into the path of said light.

5. In a two-film camera having a housing, an objective in said housing adapted to admit light into said housing, film support means in said housing for holding and transporting a pair of films transversely to the axis of said objective and facing each other from opposite sides of said axis, optical means in said housing for selectively reflecting said light to one of said films in one of two activated positions of said optical means, a single focal plane shutter in said housing adapted selectively to expose one of said films, and image-finder means on said housing opposite said objective and substantially along said axis for parallax-free viewing, said optical means being adapted, in its inactivated position, to admit said light to said image-finder means.

6. In a two-film camera as set forth in claim 5, said optical means including a pair of mirrors movable in and out of said axis of said objective, each adapted to be moved into one of said activated positions and being individually associated with one of said films.

7. In a two-film camera as set forth in claim 6, said mirrors including blanking means adapted to exclude light from one of said films when positioned out of said objective axis in said inactivated position of said optical means.

8. A two-film camera comprising a housing, an objective lens mounted in said housing, two pairs of cylindrical film supports extending in a direction parallel to the optical axis of said lens for supporting a pair of films, a single focal plane shutter for operation with both of said films, a shutter timing control for said focal plane shutter, said focal plane shutter including a plurality of curtain rollers mounted in said housing parallel to said axis and a pair of coacting shutter curtains guided by said rollers parallel to the optical axis of said lens for travel past both of said films; a reflex mechanism positioned along said axis and transversely aligned between said films and portions of said curtains which are adjacent said films, said reflex mechanism having a pivotally mounted mirror for each of said films said mirrors being selectively controllable so as to define each an operative and an inoperative position said mirrors when in the operative position being adapted to reflect light from said lens to one of said films and when in the inoperative position being adapted to cover that one of said films, a pair of film transports in said housing each connected to one of said films; a single driving mechanism connected to said focal plane shutter for energizing said shutter and connected to said reflex mechanism for operation of said mirrors, and coupling means for selectively connecting said driving mechanism to one of said film transports for actuation thereof.

9. A two-film camera as in claim 8, wherein said coupling means include a plurality of drive gears for said film transports, and a plurality of intermediate gears, said focal plane shutter including a manually operable shutter setting drive, said drive gears being engageable by means of said intermediate gears to said shutter setting drive, a manually operable control lever mounted in said camera for selectively connecting said drive gears and said film transports, and a plurality of locking members for retaining said drive gears in one of two alternate positions.

10. A two-film camera as in claim 9, wherein said reflex mechanism includes locking means for selectively retaining said mirrors in position to prevent admission of light to said films when said mirrors are both in the inoperative positions, and biasing means for urging said mirrors into the path of said light to deflect said light to one of said films.

11. A two-film camera as in claim 10, wherein said reflex mechanism includes a rotatable and axially movable cam shaft, a second control lever for axially moving said cam shaft, an eccentric arrangement connected to said second control lever for controlling movement thereof, a pair of cams keyed upon said cam shaft for rotation therewith, a push rod engaged with each of said cams and axially responsive to the diametrical variation thereof, said locking means including a leaf spring mounted in said camera and capable of arresting said mirrors in their inoperative positions, said leaf spring being in engagement at each end with one of said push rods whereby operation of one of said push rods disengages said leaf spring from a respective one of said mirrors to allow movement of said one mirror into its operative reflecting position.

12. A two-film camera as in claim 11, wherein said reflex mechanism includes a bell crank connected to said cam shaft for rotation thereof with resultant movement of one of said mirrors, a control arm engageable with said bell crank for movement thereof, means for holding said control arm out of engagement with said bell crank, resilient means for biasing said control arm toward said bell crank, and a manually operable release knob in engagement with said holding means for releasing said control arm whereby one of said mirrors is actuated.

13. A two-film camera as in claim 12, wherein said reflex mechanism includes a mirror holder for each of said mirrors, a pin corresponding to each of said mirrors and responsive to the movement of said mirrors into the operative position, a control member connected to said pins for operation thereby, a swinging spring for mounting said control member, a lever system in engagement with said control member and said focal plane shutter for releasing said focal plane shutter in response to actuation of said control member by movement of one of said mirrors.

14. A two-film camera as in claim 13, said reflex mechanism including a pair of check levers mounted in said camera for locking a respective one of said mirrors in its operative position to prevent rebounding and subsequent vibration thereof, and a transfer wheel connected to each of said check levers and operatively coupled to said shutter drive.

15. A two-film camera as in claim 14 having a diaphragm release means, wherein said diaphragm release means includes a control lug, a releasing rail mounted in said camera for connection with said control lug, a tension spring for biasing said rail in one direction, said rail being movable against the operation of said tension spring for movement of said control lug so as to move the diaphragm into the maximum opening position, a locking lever for arresting said diaphragm in said maximum opening position, said locking lever being movable by means of said bell crank for releasing the movement of said rail and for closing said diaphragm to a predetermined opening.

16. A two-film camera as in claim 15, wherein said diaphragm release means further includes a cam disc mounted in said housing, a gear wheel connecting said cam disc with said shutter setting drive, said cam disc being acted upon by said rail, whereby return of said diaphragm to said maximum opening occurs as a result of activating of said shutter.

17. A two-film camera as in claim 16, further comprising a delayed time mechanism including a plurality of escapement wheels, an anchor movement for delaying the movement of said escapement wheels, a second release knob mounted in said camera for response to said escapement wheels, a locking arm connected to said control arm for arresting the runoff of said escapement wheels.

18. A two-film camera as in claim 17, wherein said delayed time mechanism further includes a manually operated winding disc, a control pin keyed for motion with said winding disc, a second locking lever mounted in said housing and responsive to said control pin, said second locking lever being connected to said bell crank and to said escapement wheels for detaining the releasing movement of said bell crank and releasing the runoff of said escapement wheels.

19. A two-film camera as in claim 18, wherein said delayed time mechanism further includes a switch lever and a spring member, said switch lever being moved in response to the runoff of said control pin, said spring member connecting said control pin to said switch lever, and said switch lever being connected to said spring member for movement of said locking lever into the detaining position.

20. A two-film camera as in claim 19, further comprising a setting knob extending through said housing connected to said eccentric arrangement for controlling the change over from one of said films to the other.

21. A two-film camera as in claim 20, further comprising a release button, a control disc mounted for rotation with said setting knob and having a cut-away portion therein, said cut-away being capable of receiving said control arm so as to act as a detent for the position of said setting knob, a second release button for manually releasing said delayed time mechanism and runoff of said shutter, said second release button being responsive to the movement of said control arm into the cut-away portion of said control disc whereby said setting knob may be selectively set into one of two predetermined positions.

22. A two-film camera as in claim 21, further comprising a second cam disc engaged with one of said intermediate gears for response to said shutter setting drive, said bell crank and said control lever being returned to a first position by means of said cam disc.

23. A two-film camera as in claim 22 further comprising viewing means positioned on said housing along said axis at a position further away from said lens than said mirrors, so that when both mirrors are in their inoperative positions said objective lens may be used as a viewing lens whereby parallax is avoided, said viewing means also including image inverting means.

24. A two-film camera as in claim 23, wherein said viewing means comprise a Schmidt prism and a roof prism spaced therefrom, a reflecting surface on each of said prisms, said surfaces being in opposing relation to each other, and wherein said image inverting means includes a plurality of coaxially positioned lenses.

25. A two-film camera as in claim 24, wherein said viewing means include an image field lens along said axis, a concave mirror spaced away from said image field lens, a plane mirror between said image field lens and said concave mirror, and an eyepiece behind said concave mirror whereby reversal of direction is accomplished and the real reduced image from said objective lens is rendered visible in enlarged form when viewed through said eyepiece.

References Cited in the file of this patent

UNITED STATES PATENTS

| | | |
|---|---|---|
| 1,626,787 | Corlett | May 3, 1927 |
| 2,506,863 | Fassin | May 9, 1950 |
| 2,521,404 | Pentland | Sept. 5, 1950 |
| 2,540,351 | Rundell | Feb. 6, 1951 |

FOREIGN PATENTS

| | | |
|---|---|---|
| 833,155 | France | Nov. 28, 1938 |
| 707,146 | Germany | June 14, 1941 |
| 157,577 | Sweden | Jan. 15, 1957 |